Dec. 20, 1966    A. G. RICARD    3,292,881
AIRCRAFT WITH VARIABLE GEOMETRY
Filed Dec. 11, 1964    9 Sheets-Sheet 1
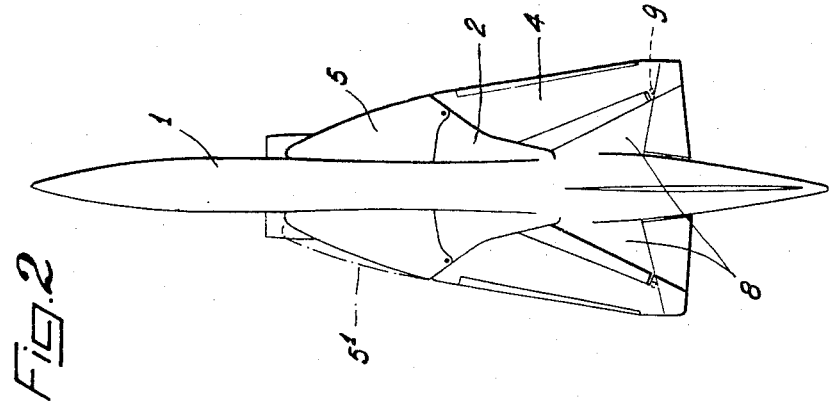
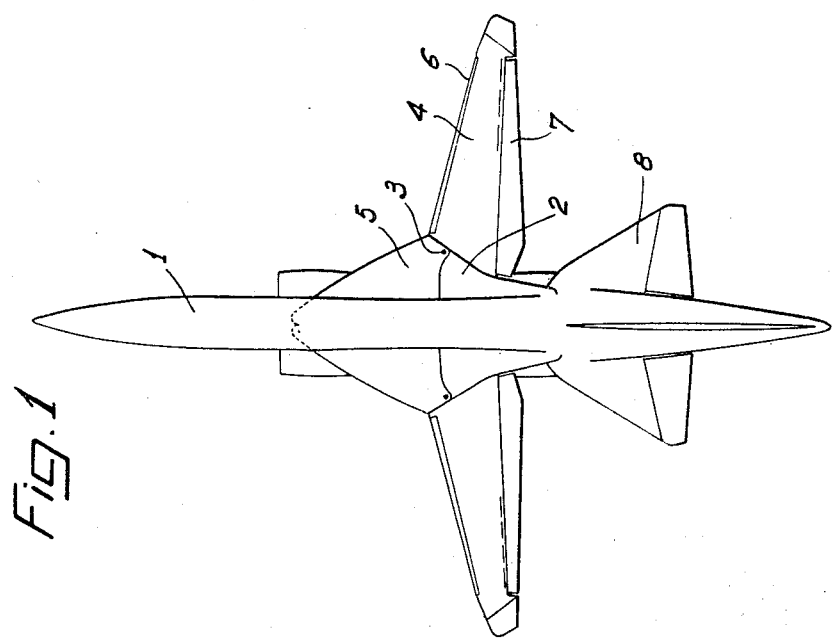

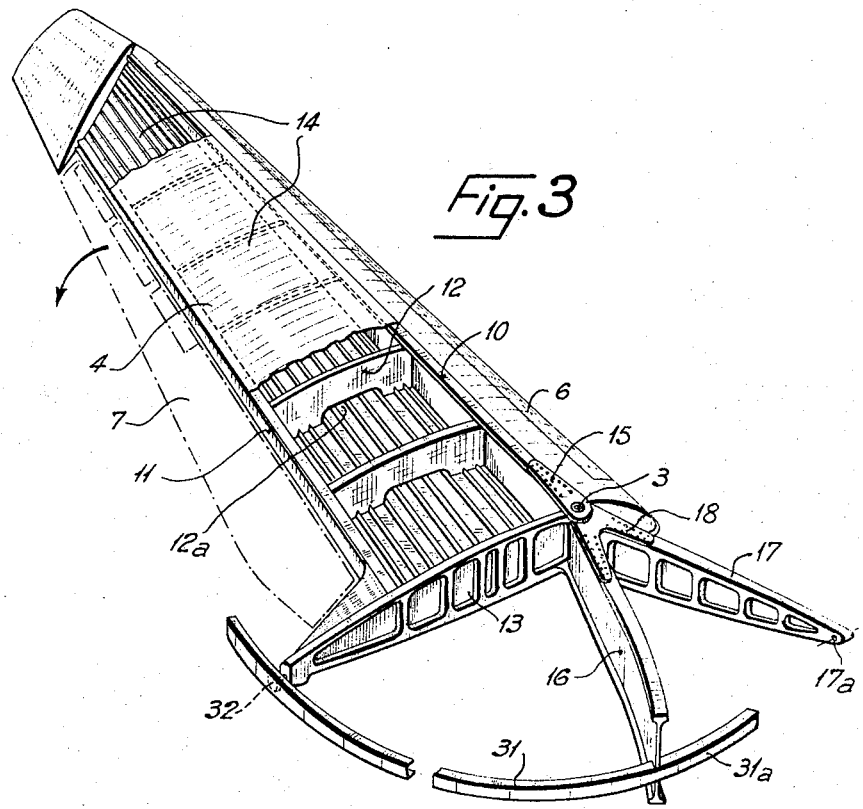
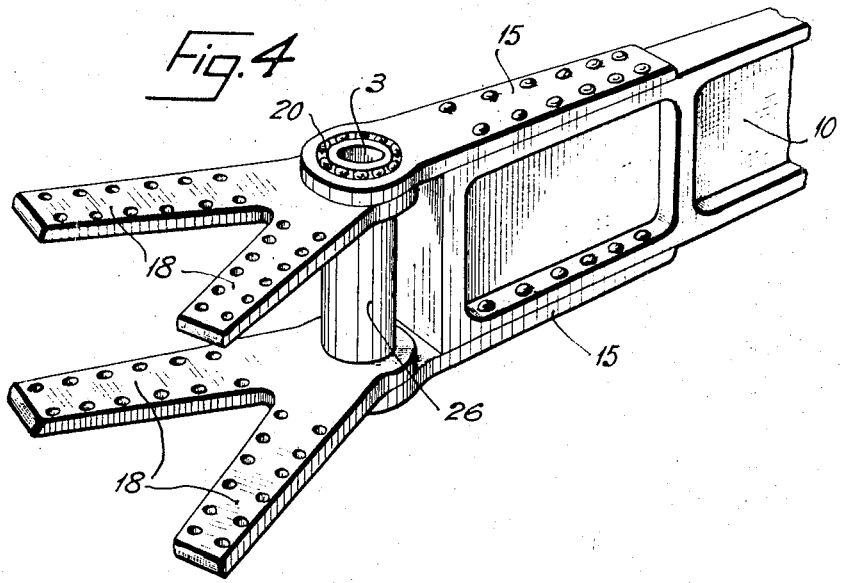

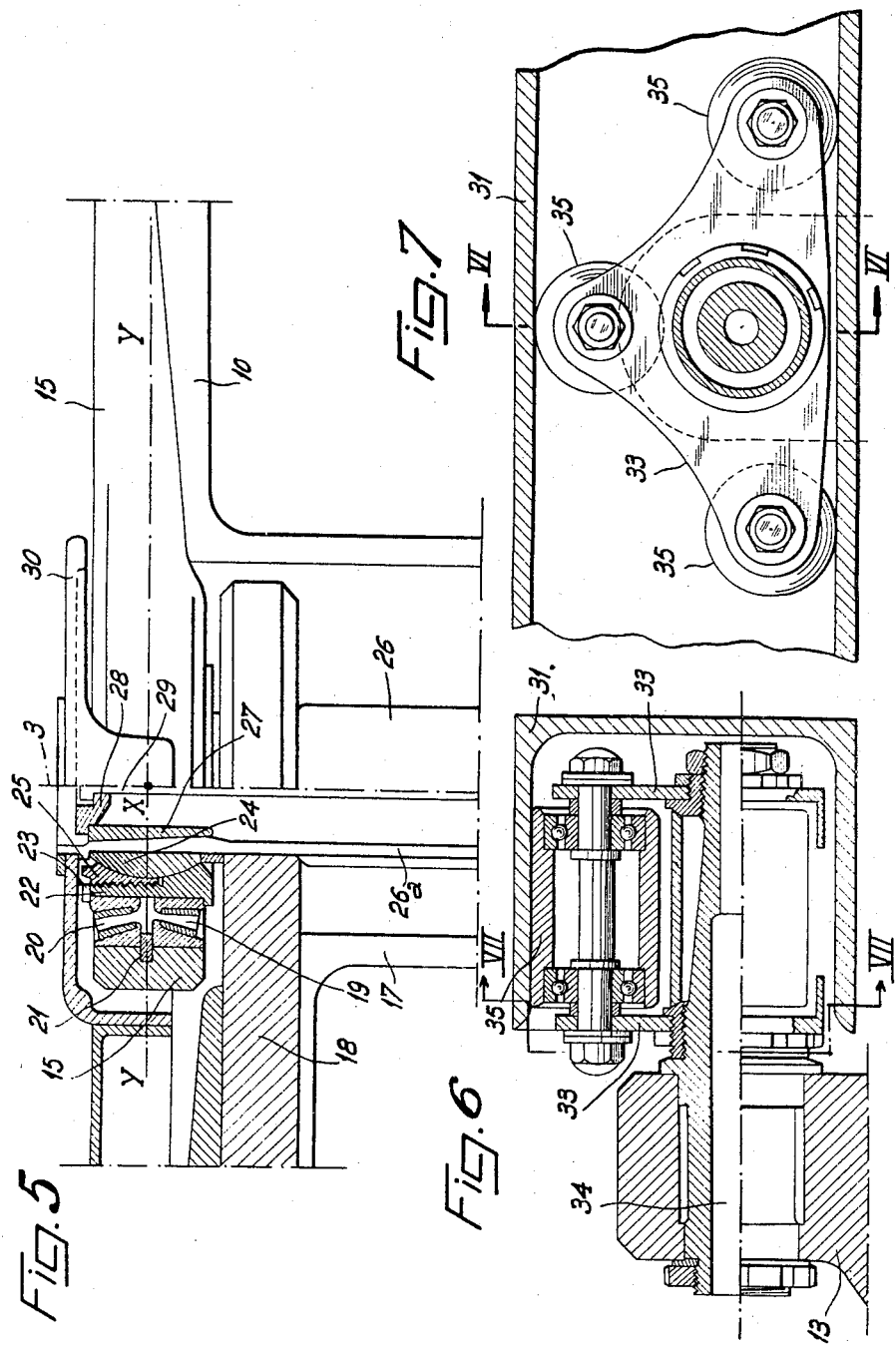

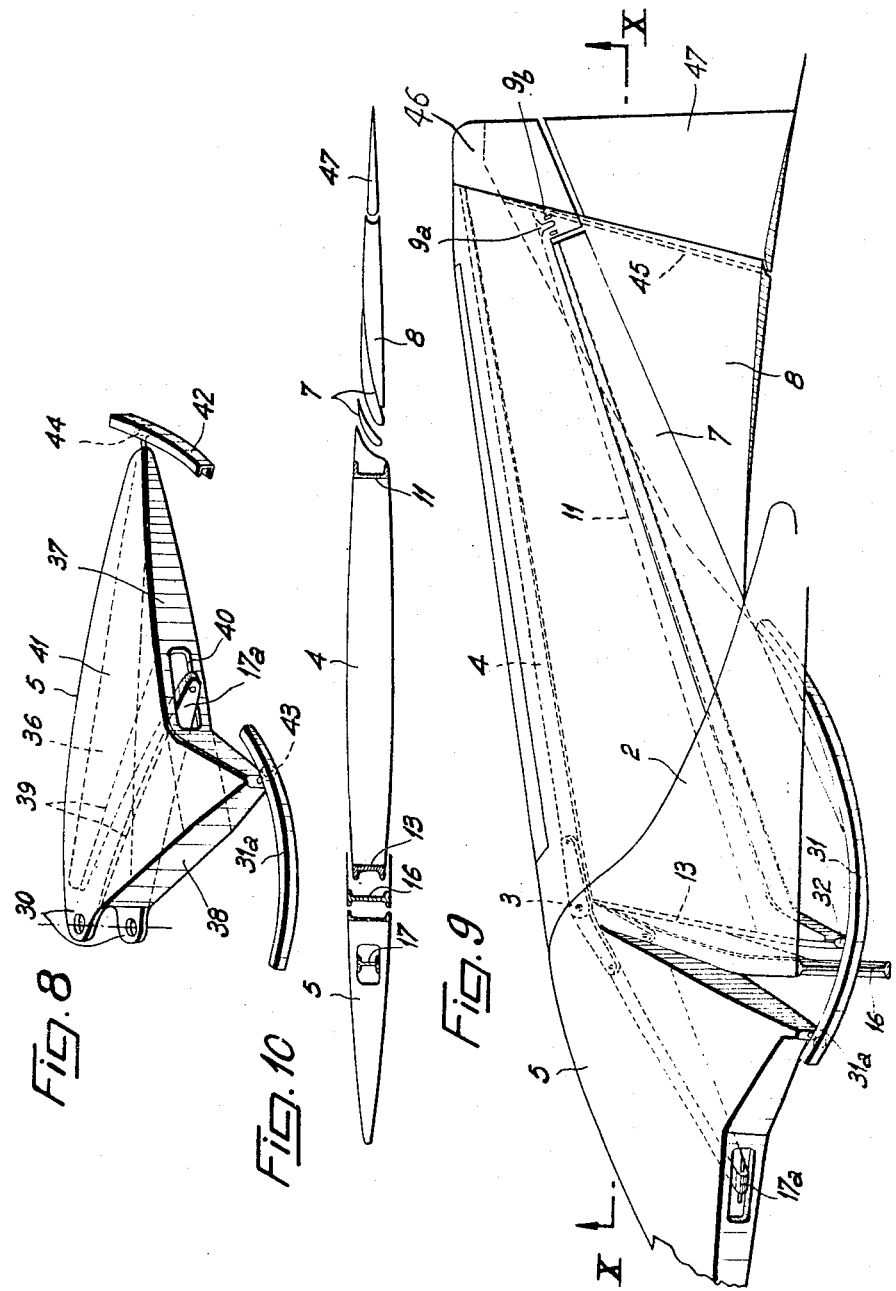

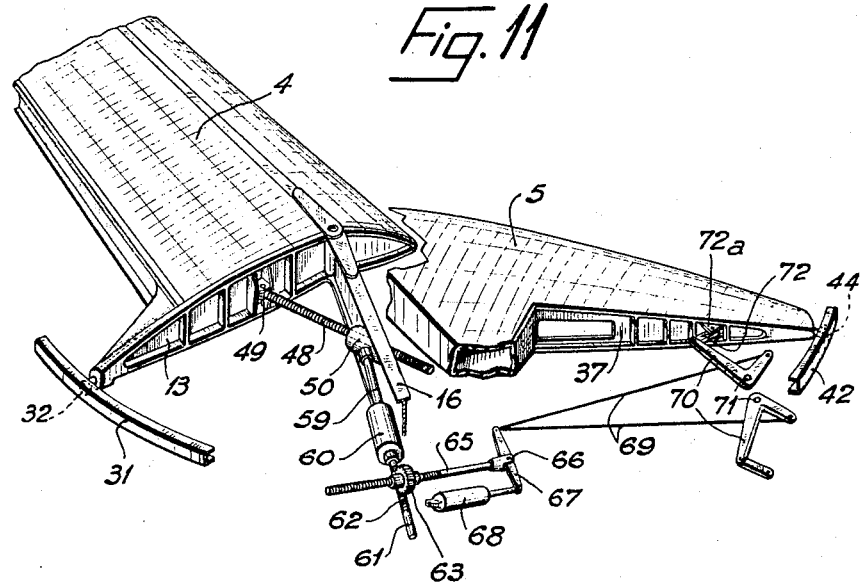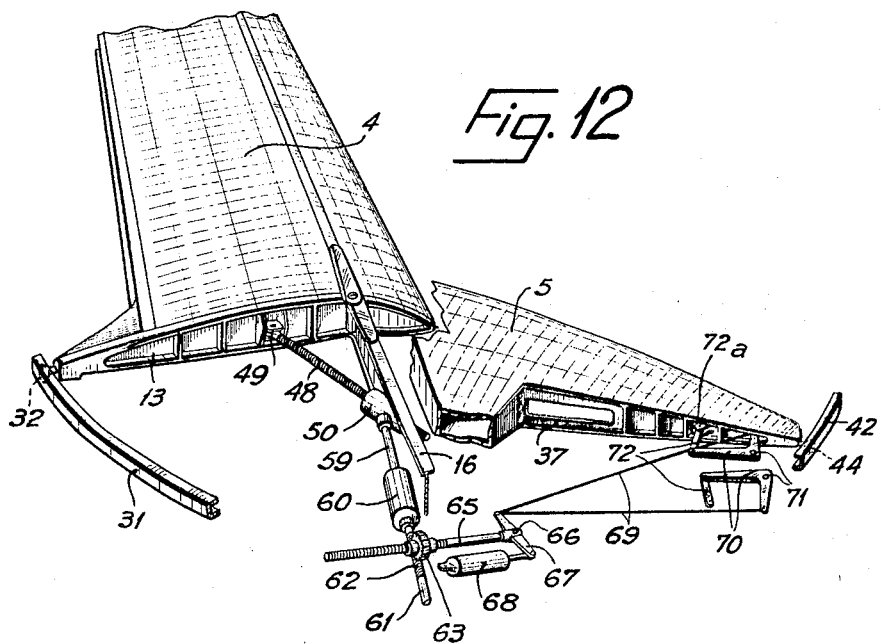

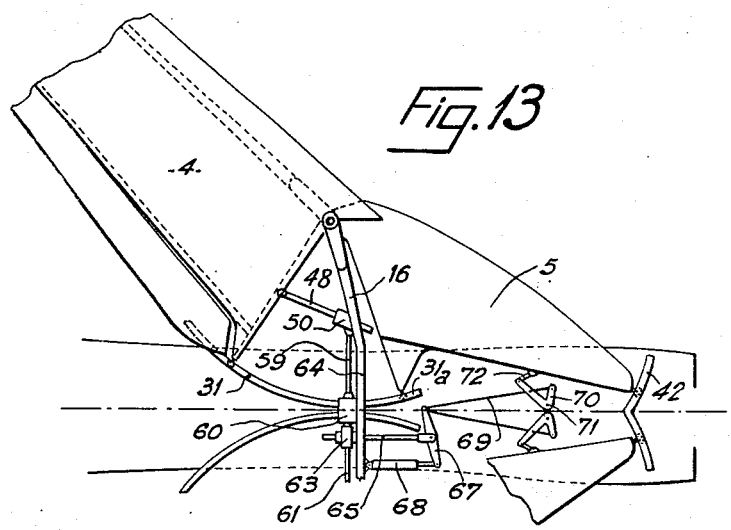

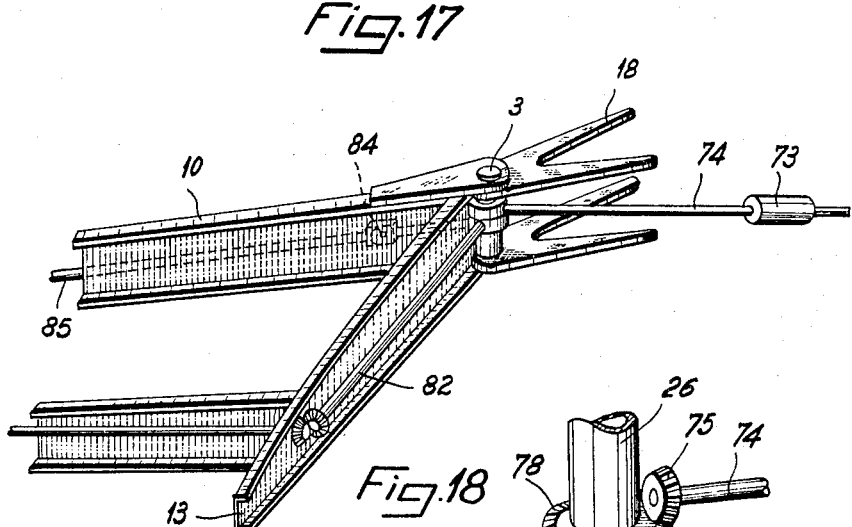
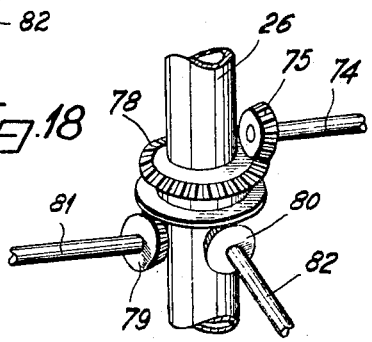
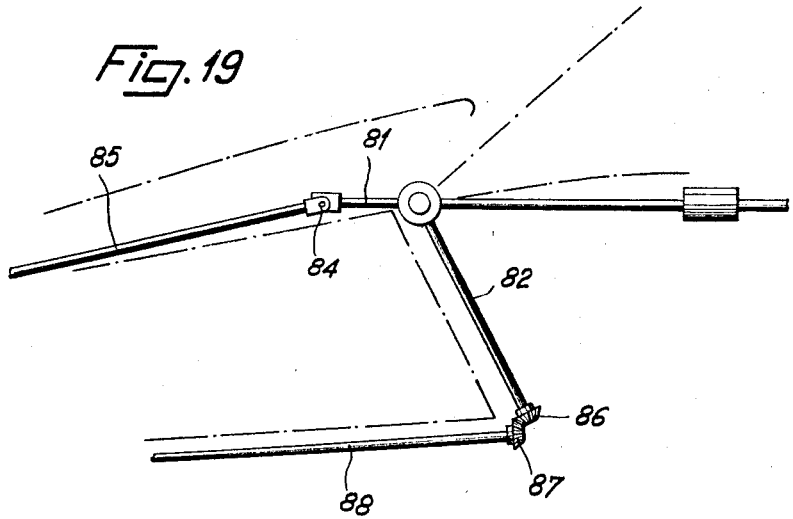

Dec. 20, 1966  A. G. RICARD  3,292,881
AIRCRAFT WITH VARIABLE GEOMETRY
Filed Dec. 11, 1964  9 Sheets-Sheet 8

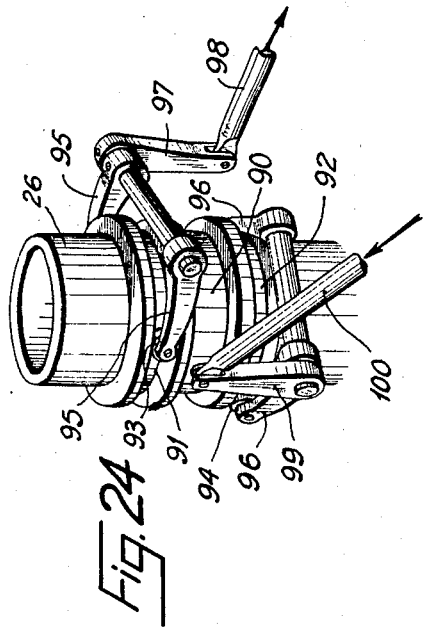
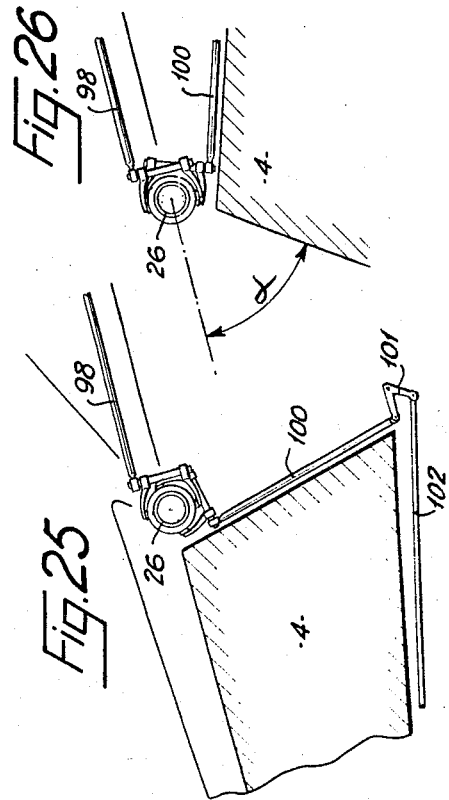
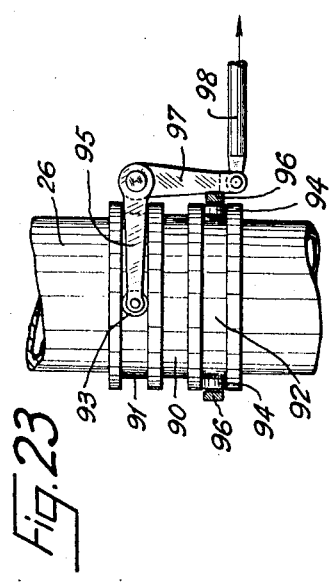
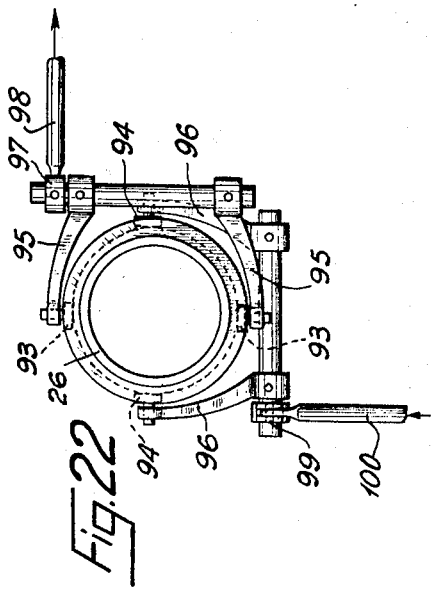

United States Patent Office 3,292,881
Patented Dec. 20, 1966

1

3,292,881
AIRCRAFT WITH VARIABLE GEOMETRY
Armand G. Ricard, Viroflay, Seine-et-Oise, France, assignor to Societe Anonyme des Ateliers d'Aviation Louis Breguet, Paris, France, a company of France
Filed Dec. 11, 1964, Ser. No. 417,625
Claims priority, application France, Dec. 27, 1963, 958,702
10 Claims. (Cl. 244—46)

In order to increase the possible speed range of an aircraft, it has already been proposed to modify the camber of part of the wing in flight. In this way various geometries are obtained which are better adapted to the various phases of flight of the machine.

The wing is given a slight camber for take-off and landing, using high-lift systems in the form of flaps at the leading edge and trailing edge so as to increase the supporting effect and to reduce minimum speeds of the aircraft. The same camber, but with the flaps raised, can be used profitably for stand-by flight where the relatively considerable elongation produces greater aerodynamic efficiency and reduces the fuel consumption.

On the other hand, for cruising flight at high speed, sonic or supersonic speed, and for attack at maximum speed in the case of military aircraft, the wing is folded rearwardly, thus considerably reducing the elongation and substantially reducing the relative thickness of the profile.

According to the present invention, the wings of the aircraft are so arranged that when they are folded rearwards they connect with the tail unit to form with the said unit a delta shape, which is particularly favourable for high speeds. Advantageously, in the folded position the wing is locked to the tail unit, which eliminates cantilever effects and permits of a considerable reduction in the stresses to which the load-bearing structure of the wing is subjected.

To obtain great effectiveness from the adjustable wing, it is desirable that the span of the mobile part should be considerable, but, in such a case, it is found that the folding of the wing rearwardly causes a considerable retreat of the aerodynamic centre, which is liable to prejudice the balance of the aircraft in flight.

The consequences of this retreat of the aerodynamic centre can be remedied by transferring fuel from the front of the aircraft to the rear, but this necessitates a heavy and delicate installation which it is not even possible to provide in every case.

The invention makes it possible very simply to counteract the effects of the retreat of the aerodynamic centre which accompanies the rearward folding of the wing. For this purpose, a portion of the wing near the fuselage and situated at the front is made mobile so that the said portion acts as a correcting means for the displacement of the aerodynamic centre.

According to one particularly advantageous form of embodiment, the said wing portion is pivotably mounted on the same pivot as the foldable main element, and it is arranged so that its front end retires within the fuselage when the main element is unfolded and issues from the fuselage when the said element is folded.

The movements of the front portion and of the main element are advantageously synchronised. The mobile front portion can also be used as an additional correcting means preventing the retreat of the aerodynamic centre when changing to supersonic flight.

2

The invention is illustrated by way of example in the accompanying drawings, in which:

FIGURE 1 is a diagrammatic plan view of an aircraft according to the invention, with the wings unfolded;

FIGURE 2 is a view similar to FIGURE 1 but wherein the wings are shown folded rearwardly and connected to the tail unit;

FIGURE 3 is a perspective view showing diagrammatically a main wing element with its guiding and pivotable mounting arrangement;

FIGURE 4 is a perspective view of the parts of the pivotable mounting;

FIGURE 5 is a view of a detail, in elevation and in half-section and on a larger scale, of the pivotable mounting;

FIGURE 6 is an elevation with half-section on VI—VI of FIGURE 7 showing the guide wheel device of the edge rib of the wing;

FIGURE 7 is a sectional view substantially on the broken line VII—VII of FIGURE 6;

FIGURE 8 shows diagrammatically in perspective how the mobile front portion of the wing is arranged and guided;

FIGURE 9 shows diagrammatically in partial perspective how the wing is combined with the tail unit;

FIGURE 10 is a sectional view on X—X of FIGURE 9;

FIGURES 11 and 12 show diagrammatically in partial perspective and in two different positions how the control of the wing elements is effected;

FIGURES 13 and 14 are diagrammatic partial plan views corresponding to the preceding;

FIGURE 15 is a detail view in axial section of the nut mechanism used for displacing the main element of the wing;

FIGURE 16 is a corresponding partial plan view;

FIGURES 17 to 21 illustrate the control of the trailing edge and leading edge flaps of the wing, and FIGURES 22 to 26 are partial views showing a warping control mechanism.

Figure 20:
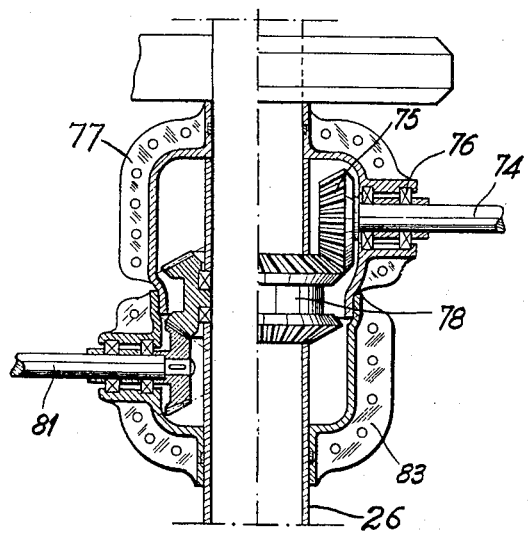

In the form of embodiment illustrated in the drawings, the aircraft comprises a fuselage 1 comprising laterally bearing brackets 2 on which there are pivotably mounted, for pivoting movement about pivots 3, a main wing element 4 and a front wing portion or element 5.

The main wing elements 4 comprise leading edge flaps 6 and trailing edge flaps 7.

The rear of the fuselage is provided with a tail unit whose horizontal elements 8 are situated approximately in the same plane as the wings.

The elements of the wings can be displaced between the two limit positions shown in FIGURES 1 and 2.

In FIGURE 1, the main elements 4 are brought forward to form wings with a slight camber, whilst the front points of the front portions 5 are retired to the maximum extent into appropriate housings provided in the fuselage. This gives the configuration used for take-off, stand-by flight at low speed and for landing.

In FIGURE 2 the main element 4 of each wing is folded rearwards and its trailing edge, the flaps of which are lifted, covers the leading edge of the tail plane 8 of the tail unit to which it can be locked at 9. The front point of the front portion 5 is slightly spaced from the fuselage. It can occupy two positions; one shown in full lines in FIGURE 2 which corresponds broadly to subsonic speeds and the second, shown in dot-dash lines and designated as $5^1$ in the left of FIGURE 2 which is used advantageously at supersonic speeds.

When the wings are thus folded, the aircraft has a delta shape.

The mechanical connection effected between the main elements of the wings and the tail unit planes permits of a considerable reduction in the wings since the latter can be calculated, for high-speed flight, in conjunction with the tail unit which supports them. The opened-out wing, which is thus used only at low speeds, may on the other hand be calculated for non-acrobatic flight conditions.

The spacing of the front points of the front portions makes it possible to compensate for the retreat of the aerodynamic centre which accompanies the folding of the main elements in the rearward direction. The position of maximum projection $5^1$ corrects the additional retreat of the aerodynamic centre when changing to supersonic flight. This compensation and correction make it possible to use elements of considerable span ensuring high degrees of aerodynamic efficiency.

As FIGURE 3 shows, the main wing element 4 has a framework comprising a main longitudinal member 10, a rear secondary longitudinal member 11, ribs 12 and a strong side rib 13. The whole is covered with a covering 14 forming with the aforesaid parts a rigid casing which in the present example is used as a fuel container; for this purpose, the ribs 12 are recessed at 12a at their lower portions to facilitate the flow of this fuel.

The main longitudinal member, by means of fittings or knuckles 15, carries the pivot pin 3 about which the element 4 can pivot on the framework of the bearing bracket 2. This framework is formed of two elements 16 and 17 connected by double knuckles 18 (see also FIGURE 4). The element 16 is situated in alignment with the longitudinal member 10 when the wing is unfolded (case shown in FIGURE 1). At its inner end it is connected to the framework of the fuselage (see also FIGURE 13).

The element 17 serves to absorb some of the bending stresses when the wing is folded (case shown in FIGURE 2) and it is pivotably connected at 17a to the framework (not shown) in the fuselage.

As FIGURE 5 shows, the articulation system at the pivot 3 can comprise for each knuckle 15 two taper roller bearings 19 and 20 which are symmetrical with respect to the axis Y—Y and are immobilized by means of a ring 21. These bearings are clamped on a sleeve 22 by a nut 23 and the sleeve is itself mounted on a spherical element 24 and clamped by an additional element 25 screwed to the sleeve. There is thus obtained an articulation which can oscillate about the axis X, ensuring equal distribution of forces over the roller bearings.

The connection with the other knuckles is effected by a tubular split pin 26 split along a generatrix at 26a (see also FIGURE 4). Conical sleeves 27 which are engaged in the ends of the pin 26 and are clamped by means of washers 28 and a bolt 29, lock the assembly. The ends of the pins 26 are also used for mounting collars 30 of the mobile front portion 5 (see also FIGURE 8).

Returning to FIGURE 3, it will be seen that the side rib 13 is guided in a U-rail 31 centered on the pivot 3, by means of a device 32 which is shown in detail in FIGURES 6 and 7.

This guide device 32 is a small carriage formed of two bearing plates 33 mounted on a pin 34 carried by the rib 13, and between which are mounted wheels 35 with ball bearings. The axes of the wheels converge towards the pivot axis 3.

The torsion of the wing is thus taken up by the rib 13 and transferred to the rail 31 which is fixed to the rib 16 and the framework of the fuselage.

FIGURE 8 shows the mobile front portion 5 which, as has been seen (FIGURE 5), is articulated by collars 30 to the tubular pin 26.

The framework of this mobile portion comprises a front longitudinal member 36, a rear longitudinal member 37, a rib 38 and two inner webs 39 which form between them a space through which extends the supporting element 17 of the bearing bracket 2, the articulated end 17a of the said supporting element passing through an elongated aperture 40 of the rear longitudinal member 37. The framework carries a covering 41.

The element 5 is in the form of a curved-side triangle and its apexes are guided one in a prolongation 31a of the rail 31 and the other in a rail 42 carried by the framework (not shown) of the fuselage; this guiding is effected by means of guide means 43 and 44 similar to that described in connection with FIGURES 6 and 7. The portion 5 can also form a fuel container.

In FIGURES 9 and 10, which show partially the elements of the wing and the elements of the tail unit, it will be seen that the element 4 comprises towards the end of its rear edge a finger 9a which comes to engage in and lock in a sleeve 9b fixed to the rear longitudinal member 45 of the plane tail element 8. The element 4 terminates also in an aileron 46 which comes to lie alongside the aileron 47 of the tail unit.

The trailing edge flap 7 is placed on the upper surface of the leading edge of the plane tail element 8. To give the wing a correct delta shape, this flap can be slightly tilted upwards as shown in FIGURE 10.

The mechanism for folding and unfolding the wing is shown in FIGURES 11 to 16.

A screwthreaded rod 48 is pivotably connected to a fitting 49 carried by the rib 13 of the main element 4. It extends through a nut 50 mounted on the supporting element 16, as FIGURES 15 and 16 show.

The nut 50 is mounted by means of thrust-type rolling contact bearings 51 in a casing 52 which is journalled in a strap 53 fixed to the element 16. It is fast with a bevel gearwheel 54 meshing with a gearwheel 55 the shaft of which 56 serves as a second pivot for the casing 52 and carries a wheel 57 meshing with a worm 58, the whole mounted in the strap 53.

The worm 58 is fixed on a shaft 59 which can drive in rotational movement a motor 60, for example a hydraulic motor, situated in the central portion of the aircraft and also driving a shaft 61 intended for the other wing, which ensures perfect symmetry of the movements of the two wings. The motor 60 is carried by an element 64 of the framework of the fuselage (FIGURE 13).

The mobile front portion 5 is also displaced under the action of the motor 60, at least during the main part of its movement.

For this purpose, the shaft 61 carries a worm 62 which meshes with a wheel 63. This wheel, which is mounted on the cross-member 64 (FIGURE 13) of the framework of the fuselage, is integral with a nut in which a screw-threaded rod 65 is engaged.

The rod 65 terminates in a strap 66 in which can pivot a lever 67 articulated on the one hand to the rod of a jack 68 itself fixed to the cross-member 64, and on the other hand to links 69. These links 69 are in turn connected in pivotable manner respectively to one of the arms of bell-crank levers 70 pivoting on pins 71 of the fuselage framework. Straps 72 connect the other arm of the levers respectively to straps 72a fixed to the longitudinal member 37 of the front portions 5.

Owing to this mechanism, as will be seen from FIGURES 11 and 12, the movements of the main element 4 and the portion 5 are effected in perfect synchronism and in accordance with a specific law determined more particularly by the form and dimensions of the levers 70.

The jack 68 makes it possible to carry out the corrective movement of the front portion when passing from subsonic to supersonic flight and vice versa.

When, as FIGURE 14 shows, the jack 68 is withdrawn whilst the rod 65 remains fixed, the jack causes the pivoting movement of the lever 67 which by the action of the links 69, levers 70 and straps 72, drives away the front portions 5 and brings them into the position shown in FIGURE 2 at 5¹. To return the portions 5 it is sufficient to make the rod of the jacks move outwards.

The main element 4 of the wing is provided with leading edge flaps 6 and trailing edge flaps 7. The mechanism described in connection with FIGURES 17 to 21 makes it possible to manoeuvre the said flaps in all positions of the main elements.

In the drawings, a motor 73 which is for example a hydraulic motor (FIGURE 17) and is carried by the fuselage framework, drives a shaft 74 terminating in a bevel gearwheel 75, in a half-casing 77 which surrounds the pivot 3 of the wing. About the sleeve 26 (FIGURE 4) of this pivot there is mounted a double level annulus 78 whose upper tooth system meshes with the gearwheel 75 and whose lower tooth system meshes with gearwheels 79 and 80 mounted (FIGURE 18) on the shafts 81 and 82 respectively.

Figure 21:
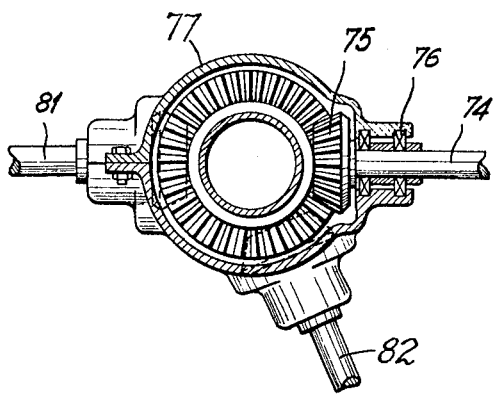

The shafts 81 and 82 are mounted in a half-casing 83 which can rotate relatively to the half-casing 77 with which it forms a sealing-tight enclosure (FIGURES 20 and 21).

The shaft 81 is connected by a universal joint 84 to a shaft 85 used for manoeuvring the leading edge tip 6 (FIGURE 19) and mounted along the longitudinal member 10.

The shaft 82, mounted along the side rib 13, terminates in a bevel gearwheel 86 meshing with a bevel gearwheel 87 fixed on a shaft 88 mounted along the longitudinal member 11 and transmitting control to the flap 7.

At movements of the wing, the lower half-casing 83 rotates with the wing element 4. Since at that time the upper half-casing remains fixed, it follows that there is a slight rotational movement of the shafts 81 and 82. The movement of the shaft 82 can be used to angle the flaps 7 at the juxtaposition of the wing with the tail unit.

The warping control, which actuates the aileron 46 situated at the end of the main element 4 (see for example FIGURE 9), is not to be detrimentally influenced by the folding or unfolding of the wing. For this purpose it is possible to construct it as shown in FIGURES 22 to 26.

Slidable on the sleeve 26 of the pivot 3 of the wing is a sleeve 90 (FIGURES 22 to 24) having two peripheral grooves 91 and 92 in which are accommodated respectively wheels 93 or 94 carried by the fork arms 95 or 96. The fork 95 is fast with a lever 97 on the end of which there is pivotably connected a control rod 98 leading to the pilot's cabin. Likewise, the fork 96 is fast with a lever 99 to which is pivotably connected a transmission rod 100. The rod 100 is itself pivotably connected to a transmission lever 101 mounted on the framework of the wing and itself pivotably connected to a rod 102 extending towards the aileron or spoiler which is to be manoeuvred.

Owing to the mechanism which has just been described, any displacement of the rod 98 results in a specific displacement of the rod 100, independently of the position which the wing element 4 occupies about its pivot. FIGURES 25 and 26 show the mechanism diagrammatically in the end positions: unfolded wing (FIGURE 25), folded wing (FIGURE 26).

I claim:

1. A variable geometry aircraft comprising in combination a fuselage provided with horizontally directed tail elements; main wing elements projecting laterally from said fuselage; vertical pivot means on said fuselage for mounting said main wing elements onto said fuselage for movement between a fore position wherein said main wing elements are extended and a rear position wherein the said main elements are retracted and connected with said tail elements; front wing elements respectively associated with said main wing elements and pivotably mounted on said fuselage on the same pivot means as the associated main wing element, for movement between a retracted position wherein the fore part of said front wing elements is retired within the fuselage and an extended position wherein said fore part is moved out of the fuselage; and actuating means for bringing said front wing elements into said retracted position when said main wing elements are brought into said extended position and conversely for bringing said front wing elements into said extended position when said main wing elemets are brought into said retracted position.

2. An aircraft according to claim 1, wherein the wings are provided with leading edge and trailing edge flaps whose controls include transmission mechanisms centered on the pivoting axis of the main elements of the wings, the control of the flaps comprising an annulus centered on the pivoting axis and shafts provided with gearwheels meshing with the said annulus.

3. An aircraft according to claim 1, wherein the wings are provided with leading edge and trailing edge flaps whose controls include transmission mechanisms centered on the pivoting axis of the main elements of the wings, the control of the flaps comprising an annulus centered on the pivoting axis and shafts provided with gearwheels meshing with the said annulus, the said shafts being mounted respectively in half-casings which are adapted to rotate relatively to one another.

4. An aircraft according to claim 1, wherein the wings are provided at their ends with ailerons which come to lie alongside those of the tail unit and wherein the warping control of the wing ailerons includes transmission mechanisms centered on the axes of pivoting of the main elements of the wings.

5. An aircraft according to claim 1, wherein the wings are provided at their ends with ailerons which come to lie along side those of the tail unit and wherein the warping control of the wing ailerons includes transmission mechanisms centered on the axes of pivoting of the main main elements of the wings, the said warping control comprising a sleeve sliding on a pivot shaft of each wing, this sleeve having grooves in which are engaged forks which are connected to rod systems one of which leads to the pilot's cabin and the other to the ailerons which are to be controlled.

6. A variable geometry aircraft as claimed in claim 1 wherein means are provided for shifting said front wing element a supplemental amount out of said fuselage when said main wing elements are brought into said retracted position whereby the retreat of the aerodynamic center which accompanies change over from subsonic to supersonic flight may be compensated.

7. The combination of claim 1 wherein said main wing elements are provided at their trailing edge with flaps and at their outer ends with ailerons, and said tail elements are provided with ailerons, the said elements being dimensioned in such a manner that when said main wing elements occupy said retracted position, said flaps are placed on said tail elements and said ailerons of said main wing elements lie alongside those of said tail elements.

8. The combination of claim 1 wherein said main wing elements are pivoted to said fuselage at the vicinity of their leading edge and comprise, along their inner side, a side rib extending towards the trailing edge and provided at its rear end with guiding wheels engaged in circular rails centered on said pivot means.

9. The combination of claim 8 wherein said front wing elements have a substantially triangular shape and are pivotably mounted on said fuselage at the vicinity of an apex, the other apexes being provided with guiding wheels engaged in circular rails centered on said pivot means.

10. The combination of claim 1 wherein said actuating means comprise a central motor, transmission means connecting said motor with said main wing elements for effecting movements of said elements; transmission means connecting said motor to said front wing elements, said last named transmission means includig intermediate lever systems having a bearing point adapted to be shifted with respect to said fuselage whereby the latitude of extension of said front wing element may be adjusted.

References Cited by the Examiner

UNITED STATES PATENTS

| | | | |
|---|---|---|---|
| 2,794,608 | 6/1957 | Johnson | 244—46 |
| 2,822,995 | 2/1958 | Bowen | 244—46 |
| 2,924,400 | 2/1960 | Ruget | 244—46 |
| 3,064,928 | 3/1962 | Toll | 244—46 |
| 3,104,082 | 9/1963 | Polhamns | 244—46 |
| 3,206,146 | 9/1965 | Toms | 244—46 |

FERGUS S. MIDDLETON, *Primary Examiner.*

MILTON BUCHLER, *Examiner.*

B. BELKIN, *Assistant Examiner.*